Nov. 10, 1925.

E. NELSON

SILO

Filed Dec. 18, 1924 2 Sheets-Sheet 1

1,560,713

Inventor
ERNEST NELSON

ATTORNEYS

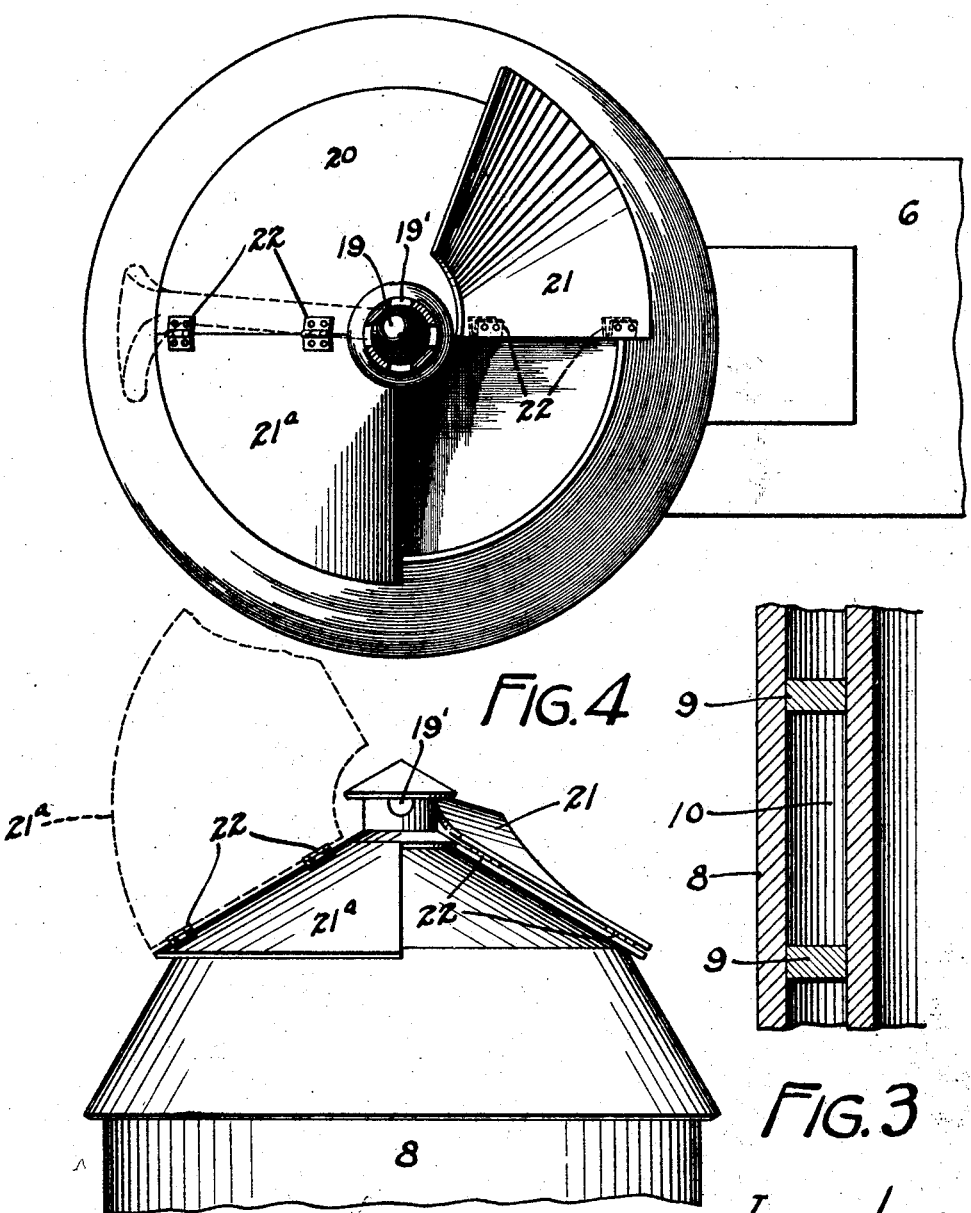

Patented Nov. 10, 1925.

1,560,713

UNITED STATES PATENT OFFICE.

ERNEST NELSON, OF BARRON, WISCONSIN.

SILO.

Application filed December 18, 1924. Serial No. 756,743.

*To all whom it may concern:*

Be it known that I, ERNEST NELSON, a citizen of the Kingdom of Sweden, resident of Barron, county of Barron and State of Wisconsin, U. S. A., have invented certain new and useful Improvements in Silos, of which the following is a specification.

In the use of a silo, the farmer experiences considerable difficulty and labor when the use of the contents of the silo has commenced, due to the freezing of the top layer and the necessity of chopping out this frozen material nearly every time a supply of the feed is removed.

The object therefore of my invention is to provide a simple inexpensive construction which, without the use of any supplementary or extraneous heating means, will enable the farmer to utilize the comparatively warm air of the barn to keep the upper portion of the material in the silo from freezing and permit its convenient handling whenever required for use as feed.

Other objects of the invention will appear from the following detailed description.

In the accompanying drawings forming part of this specification,

Figure 3 is a sectional view on the line 3—3 of Figure 1;

Figure 4 is a top view of the silo showing one of the roof doors in open position for filling purposes;

Figure 5 is a side elevation of the upper portion of the silo showing one of the door sections in its open position.

Figure 1:
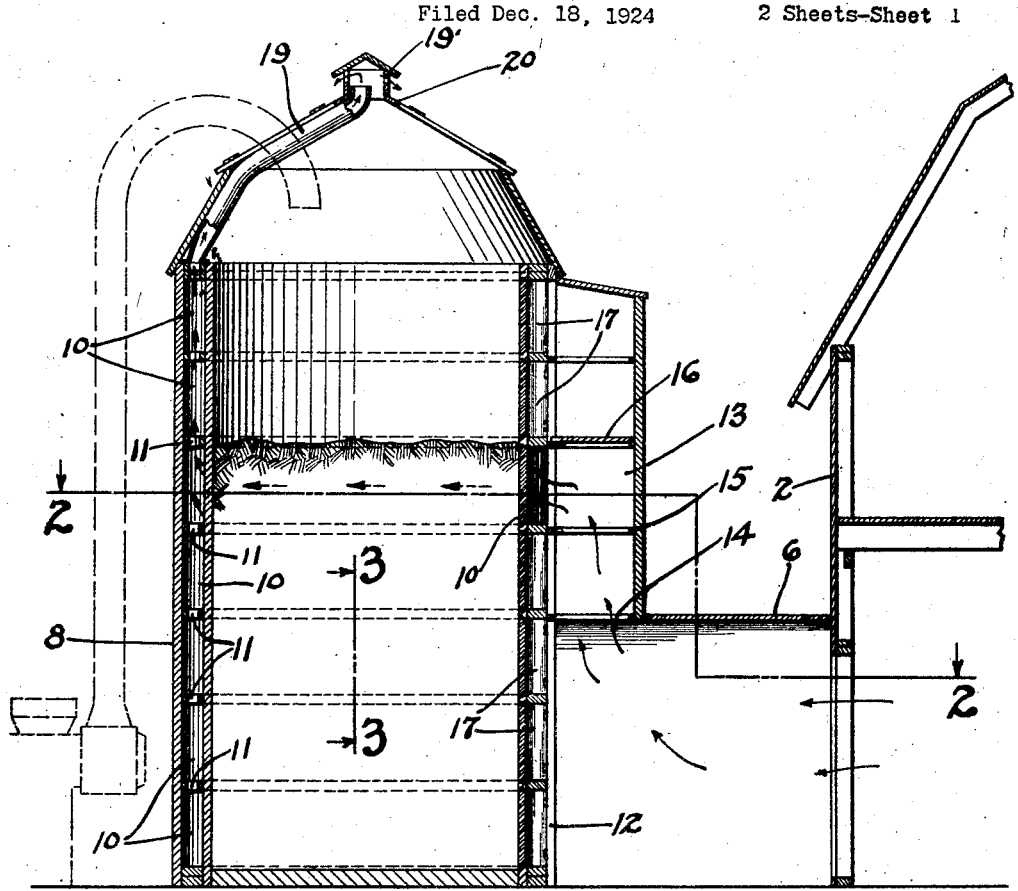
Figure 1 is a vertical sectional view through a silo embodying my invention.
Figure 2:
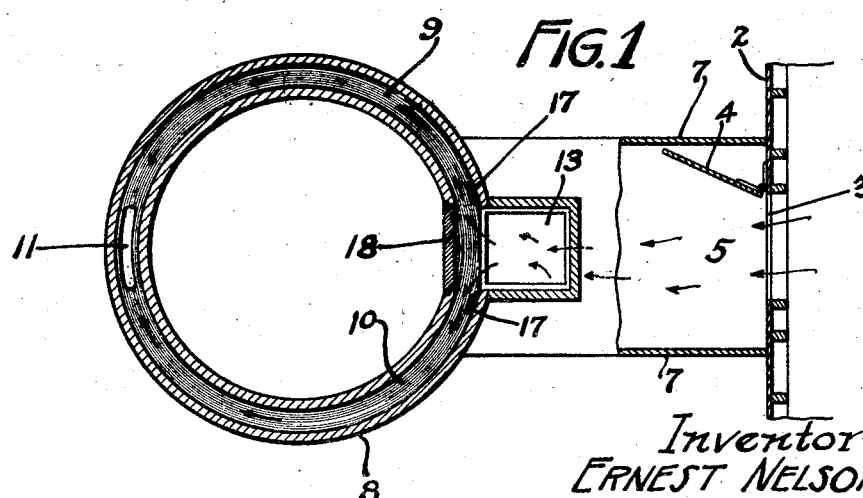
Figure 2 is a sectional view on the line 2—2 of Figure 1.

In the drawings, 2 represents the wall of a barn having a door opening 3 and door 4 therefor leading to a passage 5 which connects the barn with the silo for convenience in removing the ensilage from the silo to the barn when it is desired to feed the stock. The passage 5 has a suitable top wall 6 and side walls 7. 8 represents the silo composed of double wall construction as usual in structures of this kind, the space between the inner and outer walls being horizontally separated or divided by partitions 9 forming a series of independent annular chambers 10, one above the other in the walls of the silo, each partition having an opening 11 therein forming a communicating passage between the adjacent chambers.

The outer wall of the silo has a vertical opening 12 therein with its lower portion in communication with the passage 5 and its upper portion communicating with a trunk 13 which extends from the top wall 6 of the passage to a point opposite the top of the silo. The wall 6 has an opening 14 leading to this trunk and opposite each partition in the silo wall I arrange a support 15 for a horizontal movable plate 16 that is adapted to close the passage through the trunk 13 compelling currents of warm air entering the opening 14 from the barn to pass into the annular chamber that is in communication with the opening 13. For the purpose of regulating and directing the flow of these currents of air, I provide doors 17 hinged preferably to the outer wall of the silo in the annular chambers on each side of the opening 12 and temporarily closing these chambers to the entrance of air from the passage 5. When, therefore, the plate 16 and the chamber controlling doors are in the position shown in Figure 1, the currents of partially heated air in the barn, or from some other source, will flow through the passage 5 up through the trunk 13 and entering the annular chamber in communication with the trunk 13 will flow horizontally through this chamber around the silo, warming the inner wall thereof adjacent the top of the body of ensilage therein and preventing this top portion from freezing and requiring the use of an ax or other tool for cutting and loosening it before it can be removed and delivered to the receiving passage 5. These currents of warm air, as noted in Figure 1, pass directly from the barn to the annular chamber which encircles the upper portion of the mass of ensilage or that portion that is to be removed from the silo first. The air, therefore, is not cooled by circulating around the lower portion of the body of ensilage but instead is delivered directly to the chamber nearest the upper portion and hence I am able to utilize practically all the heat of this air to prevent the top of the ensilage from freezing instead of having the air partially cooled by circulating around a portion of the ensilage that is not to be immediately removed. Each section of the inner wall has a removable door 18 through which the ensilage is pitched into the trunk 13 and from thence falls into the passage 5 beneath, the doors being removed as the ensilage is discharged, and closed when it is desired to pass the circulating currents of warm air around the top of the ensilage. I am thus able to selectively direct currents of warm air from the passage 5 or any other source into and around any one of the horizontal chambers in the wall of the silo and preferably such currents will be directed into the chamber which encircles the top layer of the mass of ensilage and thereby this top layer is prevented from freezing and can be easily removed for feeding purposes. The air currents having passed around the upper layer of the ensilage, may flow up through the opening 11 in the partition above and from thence through the upper annular chambers to a discharge spout 19 that is provided in the roof 20, and the ventilating openings 19'. This roof has, preferably, sections 21 and 21ª hinged at 22 and adapted to be opened independently of each other to allow the insertion of a feed spout when the silo is being filled, as indicated by dotted lines in Figure 1. By providing two hinged sections, I am able to conveniently reach one of the openings in the roof with the feed spout located at a suitable point on either side of the silo.

I have found with this apparatus that warm air of the temperature of the barn can be passed through or around any one of the horizontal circulating chambers for the purpose of keeping the top of the mass from freezing, while the other chambers are closed to the entrance of such warm air, and the selected chamber to be heated will of course be the one adjacent the top layer of the ensilage which has to be handled first in feeding the stock.

I claim as my invention:

1. A silo having a series of chambers one above the other in its walls, and means for compelling currents of air to flow around the silo through any selected chamber of said series.

2. A silo having a hollow wall, a series of horizontal partitions in said wall dividing it into a series of annular chambers, and means for directing a warming medium into and through any one of said chambers.

3. A silo having a double wall and a series of horizontal annular chambers formed one above the other in said wall, and means for selectively passing a warming medium initially through one of said chambers around any desired portion of the contents of the silo.

4. A silo having a series of horizontal chambers in its wall, one above the other, and a vertical opening in the wall of the silo leading to said chambers and to the interior of the silo, means for selectively separating said chambers from said opening, and means for delivering currents of warm air to any one of said chambers to circulate therein around the contents of the silo.

5. A silo having a series of chambers one above the other in its walls, and a vertical opening leading to the interior of the silo and communicating on each side with the respective chambers, doors in said chambers for closing the passages leading thereto from said opening and adapted to be opened to allow currents of air from said opening to flow into and around a selected chamber, and means for delivering currents of air to said opening.

6. A silo having a vertical opening in its wall leading to the interior of the silo, and a series of horizontal chambers formed in its wall and communicating with said opening and with an air conducting passage, a trunk leading from said passage and communicating with said opening, means for separating each chamber from said opening, and means in said trunk for directing currents of air from said passage to any chamber communicating with said trunk.

7. A silo having a series of chambers one above the other in its walls, and a vertical opening leading to the interior of the silo and communicating on each side with the respective chambers, doors in said chambers for closing the passages leading thereto from said opening and adapted to be opened to allow currents of air from said opening to flow into and around a selected chamber, and means for delivering currents of air to said opening, said means comprising an air conducting passage, a trunk communicating therewith and with the upper portion of said opening, and plates provided in said trunk for directing the air currents from said passage to a selected chamber in the silo wall.

8. A silo having a series of chambers one above the other in its walls and a passage communicating with the interior of a barn or similar structure, and means for selectively directing air of substantially the same temperature of the barn through any one of said chambers.

In witness whereof, I have hereunto set my hand this 15th day of December 1924.

ERNEST NELSON.